(No Model.)
F. MEIXNER.
MANUFACTURE OF GUN BARRELS.
No. 477,763. Patented June 28, 1892.
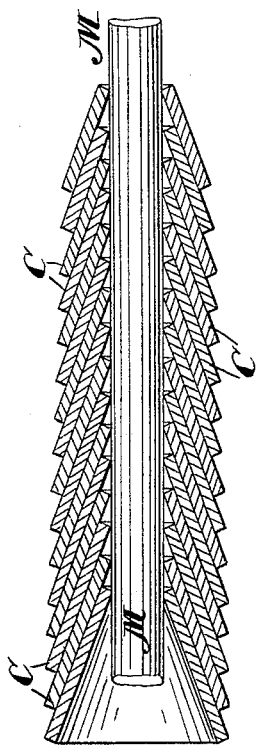

United States Patent Office.

FRANZ MEIXNER, OF HERNALS, NEAR VIENNA, AUSTRIA-HUNGARY.

MANUFACTURE OF GUN-BARRELS.

SPECIFICATION forming part of Letters Patent No. 477,763, dated June 28, 1892.

Application filed June 4, 1891. Serial No. 395,115. (No model.)

*To all whom it may concern:*

Be it known that I, FRANZ MEIXNER, a subject of the Emperor of Austria-Hungary, residing at Hernals, near Vienna, in the Province of Lower Austria, in the Empire of Austria-Hungary, have invented certain new and useful Improvements in the Manufacture of Gun-Barrels; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

The invention relates to the construction of tubular bodies in general, but more especially to the construction of the tubes or barrels for hand-firearms and ordnance; and it consists in the process of constructing such tubular bodies and in the product of the process as will now be fully described, reference being had to the drawing hereto annexed, which shows a tubular body in its rough or primary state by a longitudinal section.

Tubular bodies embodying my invention are composed of a series of frusta of a cone telescoped together and then welded and finished, and in carrying out my invention I preferably use seamless frusta stamped out of sheet metal or cast or otherwise formed of one piece, though I do not desire to limit myself thereto, as the said frusta may be formed on a suitable mandrel by bending, swaging, or rolling, and their longitudinal meeting edges united in welding the frusta together. These cone frusta C are slipped into one another upon a suitable mandrel M, and when the tube is of uniform exterior diameter the frusta used are of uniform length. When, on the contrary, the tube is to be a tapering one, the frusta used will be of a gradually-reduced length, or the said frusta may be arranged in sets, all the frusta of one set being of equal length, while the length of the frusta of the several sets gradually diminishes from one end of the series to the other, as shown in the accompanying drawing.

In the construction of hand-firearms and ordnance I prefer to employ a tubular mandrel of such thickness as to afford the necessary resistance, and after the cones C are assembled upon said mandrel they are welded together in a suitable welding-furnace and by any usual or preferred mechanical devices, and in view of the peculiar direction and position of the surfaces to be welded together care should be had that sufficient pressure be applied to produce the necessary longitudinal resistance along the axis. When the welding process is completed, the tube is first rough-bored to remove the slag, and what remains of the tubular mandrel, so that the bored tube will be composed of the united cone frusta only. Previous to the rough-boring and while the tube is still hot a steel mandrel, tapering at both ends, may first be forced through said tubular mandrel for the purpose of straightening the tube.

In order to impart to the tube a greater elasticity, it is allowed to cool and then cold hammered, though in practice I prefer to do this work after the completion of the tube—that is to say, after the exterior tooling of the same. After the tube has been rough-bored or rough-bored and straightened it is bored or tooled interiorly to the desired caliber. If the tube so constructed is to be used for hand-firearms or for ordnance or for any other purpose requiring an exterior finish, the said tube is so finished in the usual way by rolling or grinding or turning, and subsequent polishing and damaskeening, if desired, after which the tube may be rifled in the usual way.

In the construction of tubes that are subjected to great internal pressures several tubes constructed as described may be telescoped into one another and united by welding.

Instead of using a series of frusta of a cone, which when welded together will be of a length equal to that of the tube it is desired to obtain, a less number of such frusta may be employed and a tube of the desired length obtained by rolling, drawing, or otherwise elongating the same to the said required or desired length. This elongation may take place before the rough-boring, yet in practice I prefer to elongate the tube after such rough-boring and before the calibration or final boring, and by the use of rolls of the required diameter and provided with a gradually-tapering groove a tapering tube can be rolled, as will be readily understood. In the use of these tubes for firearms generally the breech thereof will be at the end toward which the base or larger end of the frusta of cones is directed, so that the projectile will travel in the direction of the smaller end of the cones, splintering or chipping being thereby prevented, since the projectile travels in the direction of the layers of which the barrel is composed, the fiber of the metal lying at an acute angle to the axis of the gun, which is not the case if the breech were located at the opposite end of the tube toward which the small end of the cone frusta is directed, as the fiber in this direction lies at a more or less obtuse angle to the axis of the gun. The location of the breech at the end of the tube toward which the base of the cones is directed, is therefore of importance in the use of these tubes for firearms.

Tubes constructed as described and destined for use as hand firearms may be damaskeened by using conical thimbles of different kinds of metal—as, for instance, iron and steel—or by the use of suitable damaskeening materials, such as rolled wire or metallic bands.

Like results may also be obtained in great variety by using frusta of cones or thimbles of a polygonal form in section, or by using frusta of cones or thimbles made of corrugated metal, or by combining the described means of damaskeening in the barrel or in each separate frustum or thimble.

In the construction of tubular bodies according to this invention, when frusta of cones are used that are not seamless they are so assembled that their joints will overlap. Finally, when tubular bodies constructed as described are used for other purposes than for firearms the smooth-boring and exterior finishing may be dispensed with.

Having thus described my invention, what I claim as new therein, and desire to secure by Letters Patent, is—

1. The mode of constructing guns which consists in assembling a series of frusta of cones upon a tubular mandrel by telescoping said cones one into another, subjecting the whole to a welding heat, uniting the cones into a homogeneous body by pressure applied externally, and boring out the tubular mandrel and forming the breech-chamber at the base of the initial cone frustum of the series, substantially as and for the purpose set forth.

2. The mode of constructing guns which consists in assembling on a tubular mandrel a series of frusta of cones by telescoping them one into another, the length of said cones being gradually reduced from the breech to the muzzle of the gun, subjecting the whole to a welding heat, uniting the cones into a homogeneous body by pressure applied externally, and boring out the mandrel, substantially as and for the purpose set forth.

In testimony whereof I affix my signature in presence of two witnesses.

FRANZ MEIXNER.

Witnesses:
A. SCHLESSING,
W. B. MURPHY.